March 18, 1969    J. H. TRAGESER    3,433,069
MASS FLOWMETER STRUCTURE
Original Filed Oct. 1, 1965    Sheet 1 of 2
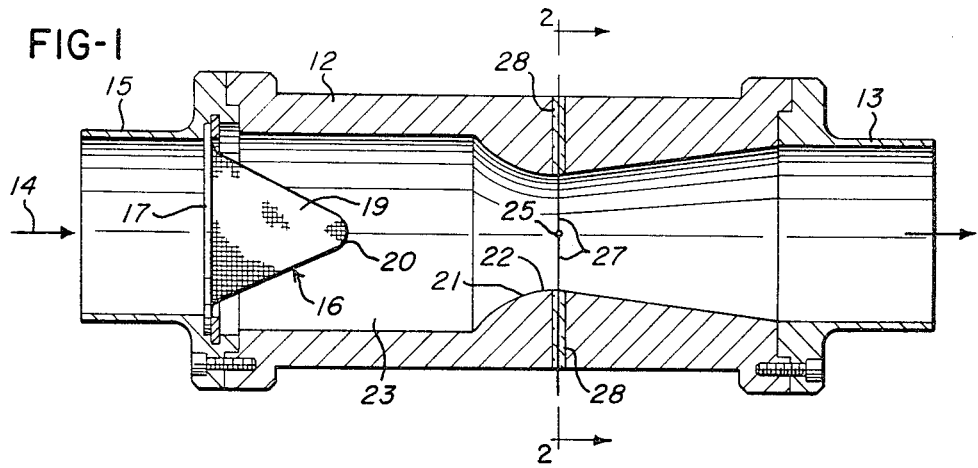
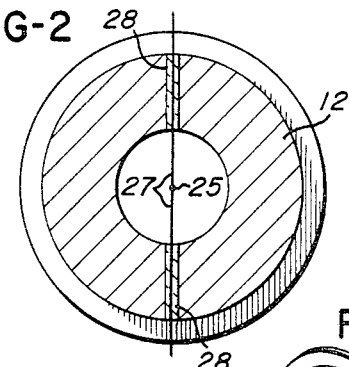
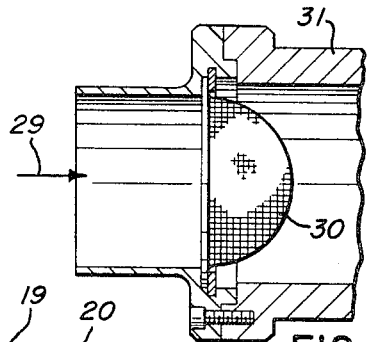
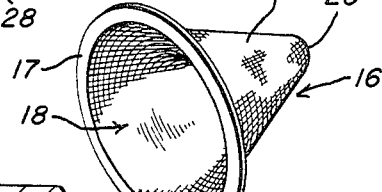
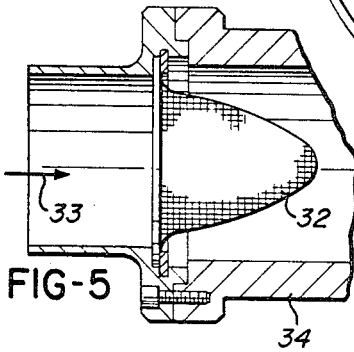
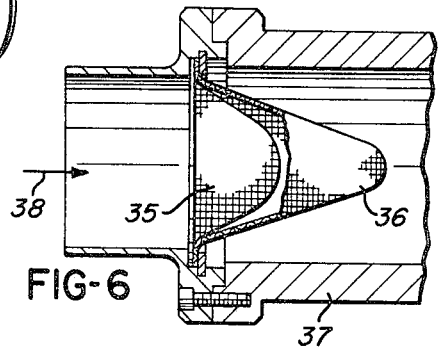
INVENTOR.
JAMES H. TRAGESER
BY William R Jacox
ATTORNEY INVENTOR.
JAMES H. TRAGESER
BY William R Jacox
ATTORNEY United States Patent Office 3,433,069
Patented Mar. 18, 1969

3,433,069
MASS FLOWMETER STRUCTURE
James H. Trageser, Kettering, Ohio, assignor to Technology Incorporated, Dayton, Ohio, a corporation of Ohio
Original application Oct. 1, 1965, Ser. No. 492,179, now Patent No. 3,374,673. Divided and this application Feb. 8, 1968, Ser. No. 704,008
U.S. Cl. 73—204
Int. Cl. G01f 1/00
3 Claims

ABSTRACT OF THE DISCLOSURE

This invention relates to a mass flowmeter. The invention relates still more particularly to fluid conduit structure for use in combination with mass flowmeter apparatus. The fluid conduit structure comprises means for substantially eliminating turbulence in fluid which flows therethrough. This invention includes thermally responsive sensor means positioned in the conduit in a location of negligible fluid turbulence.

*Related application*

This application is a division of patent application Ser. No. 492,179, filed Oct. 1, 1965, now U.S. Patent No. 3,374,673.

This invention relates to the invention disclosed in patent application Ser. No. 241,583, now United States Patent No. 3,220,255, filed Dec. 3, 1962, which is owned by the assignee of this application.

*Background of the invention*

Ordinarily, a part of a mass flowmeter consists of a section of fluid conduit which is joined in series relationship to a fluid conductor within which fluid flows from a source of fluid to a receiver of the fluid. Within this section of fluid conduit, sensor means are provided which sense the fluid in the conduit. Thus, this section of the fluid conduit may be referred to as a sensor section of fluid conduit.

A mass flowmeter, such as disclosed in said patent comprises one or more sensor elements, such as thermistors or the like which are positioned within a sensor section of a fluid conduit. Each sensor element within the sensor section of the fluid conduit is connected to suitable electrical circuitry exterior of the conduit.

In order that the sensor element or elements properly function to provide a complete and accurate signal which is independent of the temperature and pressure of the fluid, fluid which engages all of the sensor elements must be in the same condition and that condition must be stable and uniform.

Several problems have occurred with respect to fluid conduit sections within which sensor means are disposed. It has been found that under certain fluid conductor conditions, or for other reasons, fluid flow becomes extremely turbulent. Such turbulence may exist in fluid which enters a sensor section of fluid conduit. Furthermore, frequently, it may be necessary to position a sensor section of fluid conduit in an ambient which is considerably warmer or cooler than the temperature of the fluid flowing into the sensor section of the fluid conduit. Of course, such turbulence and/or differeintial temperature conditions are undesirable in a sensor section of a fluid conduit of a mass flowmeter.

Thus, an object of this invention is to provide a sensor section of fluid conduit structure having a position therewithin at which stable temperature and/or flow conditions exist.

Other objects and advantages reside in the construction of the invention, combinations thereof, the method of manufacture, and the mode of operation, as will become moer apparent from the following description.

In the drawings:

FIGURE 1 is a side sectional view of fluid conduit structure of this invention.

FIGURE 2 is a sectional view, taken substantially on line 2—2 of FIGURE 1.

FIGURE 3 is a perspective view of the foraminated member of the fluid conduit structure of FIGURE 1.

FIGURE 4 is a fragmentary side sectional view of a portion of other fluid conduit structure of this invention.

FIGURE 5 is a fragmentary side sectional view of a portion of other fluid conduit structure of this invention.

FIGURE 6 is a fragmentary side sectional view of a portion of other fluid conduit structure of this invention.

Figure 7:
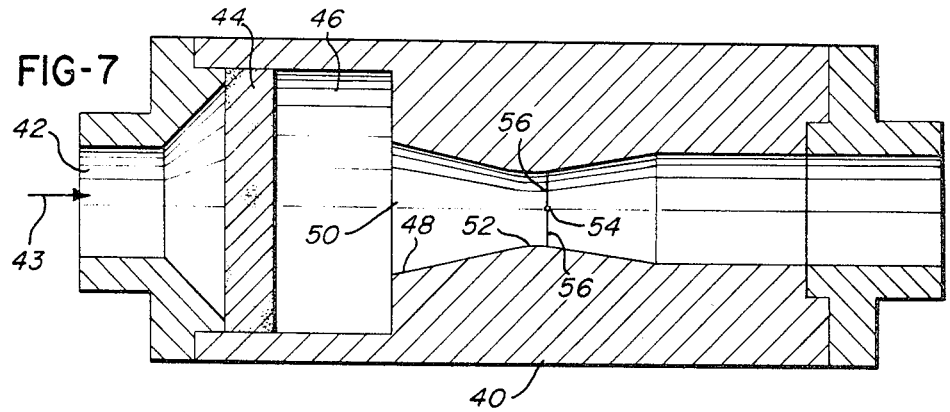
FIGURE 7 is a side sectional view showing other fluid conduit structure of this invention.

Fluid conduit structure of this invention is particularly adapted for use with a gas. However, use of the conduit structure for other fluids may be satisfactory.

Referring to the drawings in detail, FIGURE 1 illustrates a fluid conduit 12 of this invention. The fluid conduit 12 is a sensor section of fluid conduit.

The conduit 12 has an inlet portion 15 which is adapted to be connected to a fluid conductor (not shown) within which fluid flows from a source of fluid. Fluid flows into the inlet portion 15 of the conduit 12, as illustrated by an arrow 14. The conduit 12 has an outlet portion 13 which is adapted to be connected to a fluid conductor (not shown) which leads to a desired receiver of the fluid.

The fluid entering the inlet portion 15 of the conduit 12 may have passed through a fluid conductor having numerous turns or bends or other configurations. Because of the shape of the fluid conductor leading to the conduit 12 or because of conditions within the fluid conductor or for other reasons, the fluid entering the inlet end 15 of the conduit 12 may have vortices, stratification, irregularities, turbulence, etc., therein.

A generally cup-shaped screen or foraminated member 16 is mounted in the conduit 12 adjacent the inlet end 15 thereof. As shown in FIGURE 3, the foraminated member 16 has an annular flange 17 forming an opening 18. The flange 17 is attached by any suitable means to the conduit 12. The foraminated member 16 has a body portion 19, shown as being generally conical in shape. The body portion 19 extends from the flange 17 toward the outlet portion 13 of the conduit 12. The body portion 19 has an arcuate end portion 20.

Fluid flows into the opening 18 of the cup-shaped foraminated member 16. The fluid then flows outwardly through the openings in the body of the foraminated member 16 and into a portion 23 of the conduit 12. It has been found that any turbulence which may exist in fluid which enters the inlet portion 15 is greatly reduced or eliminated after the fluid passes through the foraminated member 16, thus, fluid which reaches the portion 23 of the conduit 12 is considerably more stable than fluid entering the inlet portion 15 of the conduit 12.

Then, the fluid moves to a venturi portion 21 of the conduit 12. The venturi portion 21 has a throat 22 which comprises the least transverse dimension of the venturi portion 21. Fluid flow within the conduit 12 is further stabilized by the venturi portion 21.

Any suitable sensor element 25, such as a thermistor or the like, is disposed within the venturi portion 21 of the conduit 12 and is positioned at the throat 22 or adjacent thereto, as shown in FIGURE 1. Preferably, the sensor element 25 is positioned on the downstream side of the throat 22. A plurality of sensor elements may be so located, if desired, for connection to electrical circuitry.

A sensor element, such as the element 25, and electrical circuitry associated therewith are disclosed in the aforesaid patent application. However, other types of sensor elements and/or circuitry may be employed in combination with fluid conduit structure of this invention.

Electric conductor leads 27 are attached to the sensor element 25 and extend outwardly from the conduit 12 through suitable insulator members 28 which are mounted in the wall of the conduit 12. The electric conductor leads 27 are joined to suitable electrical circuitry, not shown, for indicating or measuring mass rate of fluid flow in the conduit 12.

As a result of the flow of fluid through the foraminated member 16 and/or through the venturi section 21, fluid engaging the sensor element 25 has a substantially stable flow pattern and the sensor element 25 can thus accurately sense the fluid flowing in the conduit 12.

Numerous other shapes of foraminated members may be used in fluid conduit structure of this invention. FIGURES 4 and 5 illustrate, for example, other shapes of foraminated members which may be employed in association with fluid conduit structure of this invention.

FIGURE 4 shows a cup-shaped foraminated member 30 which has a generally arcuate or hemispherical configuration. The foraminated member 30 is disposed within a conduit 31. An arrow 29 illustrates the direction of fluid flow into the conduit 31.

FIGURE 5 shows a cup-shaped foraminated member 32 which has a somewhat parabolic shape. The cup-shaped foraminated member 32 is disposed within a conduit 34. An arrow 33 illustrates the direction of fluid flow into the conduit 34.

FIGURE 6 shows a cup-shaped foraminated member 35 which may be of any desired configuration. The cup-shaped foraminated member 35 is positioned within a cup-shaped foraminated member 36. The foraminated members 35 and 36 are disposed within a conduit 37. An arrow 38 illustrates the direction of fluid flow into the conduit 37.

Foraminated members of other configurations may also be used in fluid conduit structure of this invention to reduce instability in fluid flow. Furthermore, any plurality of foraminated members may be used in any desired arrangement for stabilization of fluid flow.

FIGURE 7 shows a conduit 40 which has an inlet or entrance portion 42. An arrow 43 illustrates the direction of fluid flow into the conduit 40. Within the conduit 40 and adjacent the inlet portion 42 is a foraminated body 44. The body 44, preferably, comprises a material such as porous metal or foam metal or the like. The body 44 may comprise any material having a sigh value of internal wall surface area relative to its volume. The body 44 should have good heat transfer characteristics and good diffusioon characteristics.

The body 44 is disposed within a cavity 46 which has a given transverse dimension. The transverse dimension of the cavity 46 is larger than the transverse dimension of the inlet portion 42. Therefore, fluid entering the conduit 40 at the inlet portion 42 thereof flows through the body 44 without appreciable decrease in pressure of the fluid.

The body 44 serves as a stabilizer of fluid flow, therefore, reducin gor eliminating any turbulence which may exist therein. The body 44 also serves as means to reduce any temperature differential which may exist between the temperature of fluid entering the conduit 40 and the temperature of the conduit 40.

The conduit 40 has a venturi portion 48 which is in communication with the cavity 46. The venturi portion 48 has an entrance 50 which is shown as having a smaller transverse dimension than the cavity 46. The venturi portion 48 has a gradually decreasing transverse dimension from the opening 50 to a throat 52.

Positioned in the throat 52 or adjacent the throat 52 is a sensor element 54 having electric conductor leads 56, which extend to suitable electrical circuitry.

Thus, fluid which engages the sensor element 54 is in a substantially stable condition.

Figure 8:
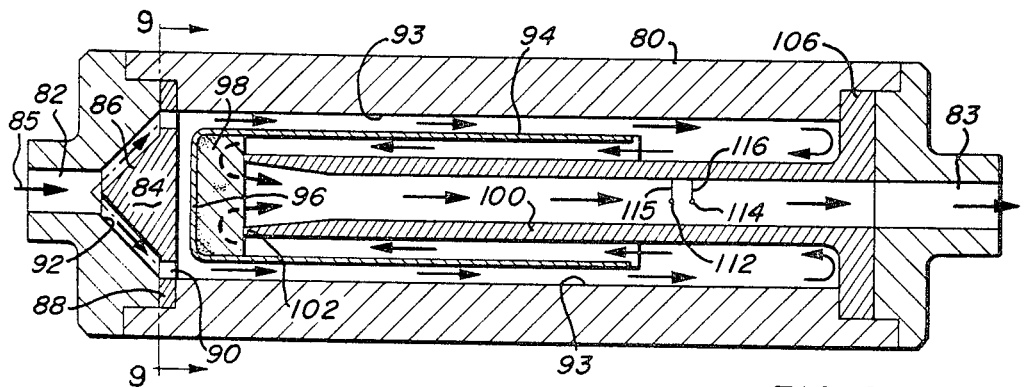
FIGURE 8 is a side sectional view showing other fluid conduit structure of this invention.
Figure 9:
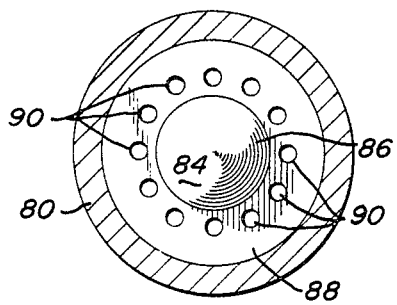
FIGURE 9 is a sectional view taken substantially on line 9—9 of FIGURE 8.

FIGURES 8 and 9 show a conduit 80 having an entrance or inlet portion 82 and an outlet portion 83. An arrow 85 illustrates the direction of fluid flow into the conduit 80. The conduit 80 is particularly adaped for use in an ambient having a temperature considerably different from the temperature of fluid entering therein.

Adjacent the inlet or entrance portion 82 of the conduit 80 is a shield 84 which has a generally conical body portion 86 and a flange 88. The flange 88 is attached to the conduit 80. The flange 88 is provided with a plurality of openings 90. The conduit 80 has internal sloping walls 92 adjacent the body portion 86 of the shield 84.

The conduit 80 has an inner wall surface 93. Within the conduit 80 and spaced from the inner wall surface 93 is a tube 94 provided with an end wall 96. The end wall 96 is spaced from the shield 84. Within the tube 94 and adjacent the end wall 96 thereof is a foraminated body 98 of porous metal or foam metal or the like. The body 98 may be any material having a high value of internal wall surface area relative to its volume and which has good diffusion characteristics and good heat transfer characteristics.

Within the tube 94 and substantially concentric therewith is a tube 100. The tube 100 has an end 102 which is in engagement with the foraminated body 98. If desired, the end 102 of the tube 100 may be attached to the body 98 for support of the body 98 and the tube 94. The tube 100 is shown as having a support flange 106 which is attached to the conduit 80. The tube 100 is in communication with the outlet opening 83 of the conduit 80.

Within the tube 100 is a sensor element 112 and a sensor element 114. The sensor elements 112 and 114 are shown as being supported by conductors 115 and 116, respectively, which may also serve to connect the sensor elements 112 and 114 to electrical circuitry.

As stated above, fluid entering the inlet opening 82 of the conduit 80 may be of a temperature considerably different from the temperature of the ambient within which the conduit 80 is disposed. Fluid entering the inlet opening 82 flows through the passage formed between the sloping walls 92 and the body portion 86 of the shield 84. The body portion 86 of the shield 84 serves to prevent direct transfer of heat from the fluid to the end wall 96 of the tube 94.

The fluid passes through the openings 90 in the shield 84 and flows along the tube 94 between the outer surface thereof and the inner wall surface 93 of the conduit 80, as illustrated by arrows in FIGURE 8. As the fluid so moves, the temperature thereof gradually changes toward the temperature of the conduit 80 as heat transfer therebetween occurs. After the fluid moves from the exterior surface of the tube 94, the fluid continues to move adjacent the inner wall surface 93 of the conduit 80 toward the outlet portion 83. The flange 106 of the tube 100 prevents flow of fluid directly to the outlet portion 83 of the conduit 80. Thus, fluid flowing from the exterior surface of the tube 94 reverses direction from the flange 106 and enters the tube 94. The fluid then moved between the inner surface of the tube 94 and the outer surface of the tube 100. During this portion of travel of the fluid, the fluid temperature changes to a value closer to that of the conduit 80.

The fluid then enters the foraminated body 98 and passes therethrough into the tube 100. As the fluid moves through the foraminated body 98 the temperature thereof changes further toward the temperature of the conduit 80. Furthermore, the flow pattern of the fluid is further stabilized as the fluid passes through the foraminated body 98. The fluid then moves within the tube 100. When the fluid reaches the sensor elements 112 and 114 within the tube 100, any stratification or temperature levels in the fluid have been eliminated. Any turbulence in the fluid has been substantially eliminated. Thus, the condition of the fluid is stable as it reaches the sensor elements 112 and 114. Furthermore, the condition of the fluid engaging the sensor element 112 is the same as the condition of the fluid as it engages the sensor element 114.

Although the preferred embodiment of the device has been described, it will be understood that within the purview of this invention various changes may made in the form, details, proportion and arrangement of parts, the combination thereof and mode of operation, which generally stated consist in a device capable of carrying out the objects set forth, as disclosed and defined in the appended claims.

I claim:
1. In a mass flowmeter:
   a fluid conduit having an inlet portion and an outlet portion, the conduit being adapted to have fluid flow therethrough from the inlet portion thereof to the outlet portion, thereof,
   a generally cup-shaped foraminated member within the inlet portion of the conduit and extending thereacross, the cup-shaped foraminated member being provided with a complete body portion across the inlet portion of the fluid conduit and directed toward the outlet portion, the body portion having only small openings therein, the body portion having gradually decreasing transverse dimensions from the inlet portion toward the outlet portion,
   the conduit having a venturi portion therewithin intermediate the inlet portion and the outlet portion, the venturi portion having a throat,
   a thermally responsive sensor element disposed within the venturi portion adjacent the throat thereof,
   the cup-shaped member and the venturi portion of the conduit controlling the pattern of fluid flow within the conduit so that any turbulence which may exist in the fluid at the inlet portion of the conduit is substantially removed from the fluid before the fluid reaches the sensor element, fluid flow at the position of the sensor element thus being substantially stable and free of turbulence.
2. Apparatus of the type described comprising:
   a fluid conduit having an inlet portion and an outlet portion, the conduit having internal walls of substantially constant dimensions intermediate the inlet portion and the outlet portion,
   a shield adjacent the inlet portion of the conduit, the shield having a peripheral portion provided with a plurality of openings therethrough,
   a first tubular member within the fluid conduit and substantially coaxial therewith, the first tubular member having a closed end adjacent the shield but spaced therefrom, the first tubular member having an outerer surface spaced from the internal walls which form the flow passage so that a flow passage is formed between the outer surface of the first tubular member and the internal walls of the conduit, the first tubular member having an open end spaced from the outlet portion of the conduit,
   a foraminated body within the first tubular member adjacent the closed end thereof,
   a second tubular member, the second tubular member being within the first tubular and having a smaller transverse dimension than the first tubular member so that a flow passage is formed between the first tubular member and the second tubular member, the second tubular member having an end in engagement with the foraminated body which is adjacent the closed end of the first tubular member, the second tubular member having an opposite end which is in communication with the outlet portion of the conduit,
   thermally responsive sensor means within the second tubular member,
   a fluid entering the conduit through the inlet portion of the conduit, the fluid then flowing through the openings of the shield, the fluid then flowing through the passage between the internal walls of the conduit and the first tubular member, the fluid then flowing between the first tubular member and the second tubular member, the fluid then flowing through the foraminated body, the fluid then flowing through the second tubular member and into the outlet portion of the conduit and thence from the conduit,
   the fluid which engages the sensor means within the second tubular member thus being substantially stable in temperature and flow pattern.
3. In a mass flowmeter:
   a fluid conduit having a flow pasage therethrough provided with an inlet portion and an outlet portion,
   a first generally cup-shaped foraminated member having an open end extending across the flow passage adjacent the inlet portion thereof, the first cup-shaped foraminated member having a body portion extending toward the outlet portion of the conduit,
   a second generally cup-shaped foraminated member, the second generally cup-shaped foraminated member having an open end extending substantially across the flow passage and having a body portion adjacent the body portion of the first foraminated member and extending toward the outlet portion of the flow passage,
   the first cup-shaped foraminated member being closer to the outlet portion of the fluid conduit than the second cup-shaped foraminated member,
   thermally responsive sensor means within the flow passage of the conduit intermediate the first cup-shaped foraminated member and the outlet portion of the fluid conduit, fluid which engages the sensor means thus passing through both of the cup-shaped foraminated members, the cup-shaped foraminated members controlling the flow pattern of the fluid which passes therethrough for stabilization thereof, fluid which engages the sensor means thus being substantially stable.

References Cited

UNITED STATES PATENTS

| 2,026,179 | 12/1935 | Keith | 73—190 |
| 2,255,771 | 9/1941 | Golay | 73—204 X |
| 2,922,305 | 1/1960 | Wehrman | 73—349 X |
| 2,970,475 | 2/1961 | Werner | 73—204 X |
| 3,000,213 | 9/1961 | Eves et al. | 73—204 X |
| 3,016,745 | 1/1962 | Simon | 73—349 X |
| 3,216,249 | 11/1965 | Joel | 73—204 |
| 1,325,040 | 12/1919 | Packard | 73—204 |
| 2,197,818 | 4/1940 | Tozier | 73—204 |

FOREIGN PATENTS 861,337   2/1961   Great Britain.

RICHARD C. QUEISSER, *Primary Examiner.*

E. D. GILHOOLY, *Assistant Examiner.*

U.S. Cl. X.R.

73—349; 330—26